United States Patent

[11] 3,622,360

| [72] | Inventors | Andrew B. Swanson<br>Chicago;<br>Rudolph T. Loher, Clarendon Hills, both of Ill. |
|---|---|---|
| [21] | Appl. No. | 13,531 |
| [22] | Filed | Feb. 24, 1970 |
| [45] | Patented | Nov. 23, 1971 |
| [73] | Assignee | Nalco Chemical Company<br>Chicago, Ill. |

[54] RAMMING MIXES
4 Claims, 1 Drawing Fig.

[52] U.S. Cl ..................................................... 106/65,
106/67
[51] Int. Cl ....................................................... C04b 35/10
[50] Field of Search ............................................ 106/65, 67

[56] References Cited
UNITED STATES PATENTS

| 3,179,526 | 4/1965 | Dolph ........................... | 106/65 |
| 3,284,218 | 11/1966 | King ............................. | 106/65 |
| 3,303,034 | 2/1967 | Troell et al. .................. | 106/65 |
| 3,298,839 | 1/1967 | Troell ........................... | 106/65 |
| 3,440,070 | 4/1969 | Dewey ......................... | 106/67 |

Primary Examiner—James E. Poer
Attorneys—Kinzer, Dorn & Zickert, John G. Premo and Charles W. Connors ABSTRACT: An alumina-phosphoric acid ramming mix has extended shelf life imparted thereto by coating the alumina particles with an inhibitor selected from the group consisting of nitrilotriacetic acid and ethylenediamine-tetraacetic acid, the inhibitor preventing premature reaction between the alumina and phosphoric acid.

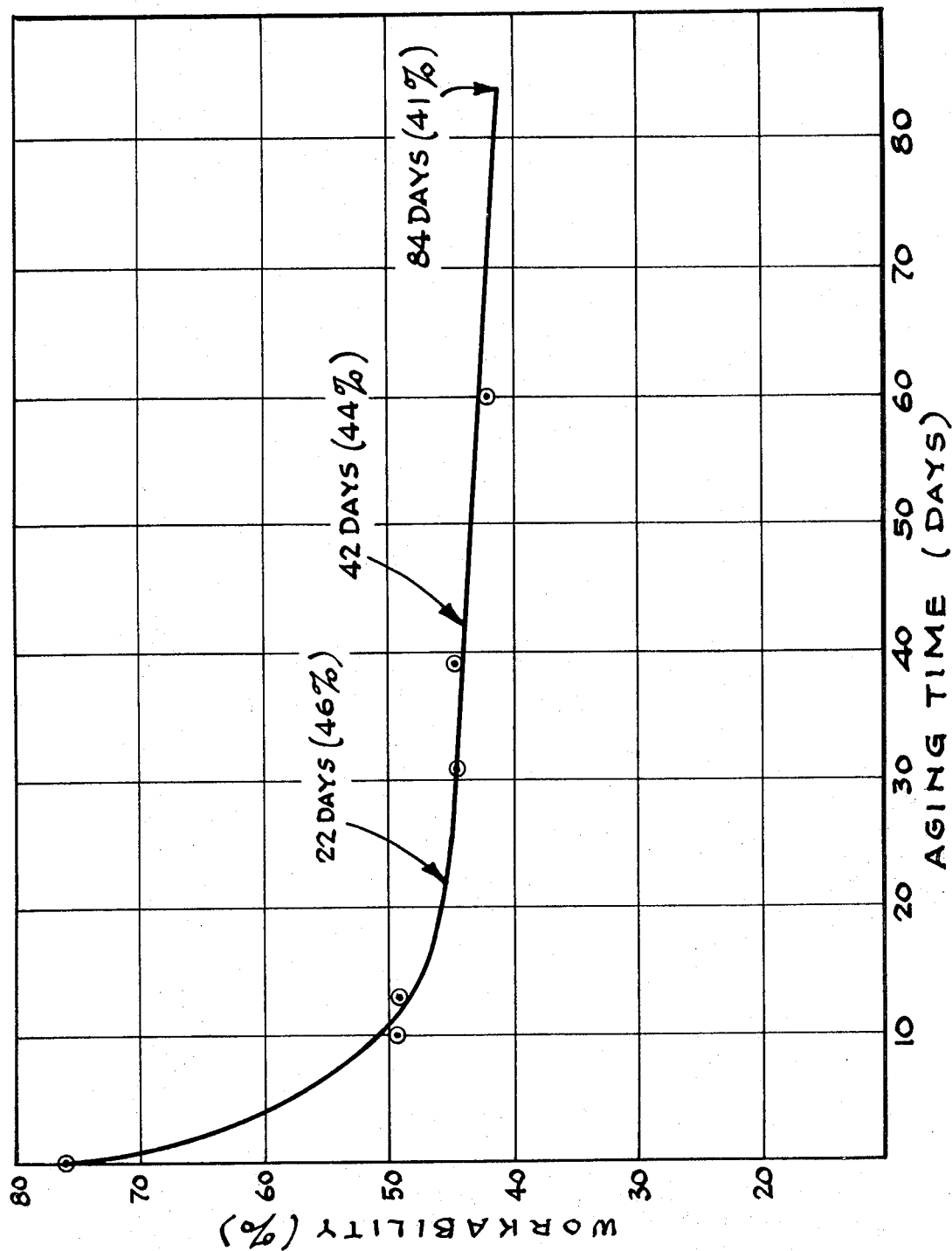

RAMMING MIXES

This invention relates to the production of so-called ramming mixes in which the major, essential constituent is alumina.

Ramming mixes of refractory content are used to reline the interior walls or furnaces, cupolas, ladles and the like where temperatures are of such high order, say 2,500° F. as to demand the thermal resistance of an expendable refractory. In the usual case, the ramming mix is in a somewhat plastic state, easily applied in rough form, whereafter the more permanent state is attained by means of an air-operated ram followed by a high temperature bake-out which hardens and cures the rammed lining.

A conventional ramming mix is one composed principally of alumina, bondable chemically by phosphoric acid up to the temperature point where the alumina particles themselves become incipiently fused or sintered to the more permanent state.

It is known that a ramming mix of alumina and phosphoric acid ages (has a short shelf life) in the sense that if not used within a reasonable time after compounding it hardens or sets to the point where plasticity is so low as to render the mix unusable. In other words, the mix, within a progression of time, becomes less workable.

In a paper entitled "An Inhibited Phosphoric Acid for Use in High-Alumina Refractories," published in *The American Ceramic Society Bulletin*, July 7, 1966, the phenomenon of such aging is examined. The authors (Lyon et al.) reported, after extensive study, that aging could be retarded by an inhibitor in the form of oxalic acid, deemed superior from the standpoint of performance compared to the other citric acid, gluconic acid, and succinic acid. Oxalic acid was selected in spite of the recognized industrial hazard presented by the toxicity of its vapors.

The primary object of the present invention is to retard aging of alumina-phosphoric acid ramming mixes by an inhibitor which is not toxic and which we unexpectedly found to retard aging to a pronouncedly greater degree than oxalic acid.

Another object of the invention is to determine such inhibitor as one which will not produce objectionable porosity in the mix subjected to thermal hardening at the place of its application.

More specifically it is an object of the present invention to preserve and prolong the workability of an alumina-phosphoric acid ramming mix by incorporating therewith an inhibitor which retards aging more efficiently than any inhibitor heretofore known to us, being a nontoxic inhibitor selected from the group consisting of nitrilotriacetic acid and ethylenediaminetetraacetic acid which may be used at one-third the strength of oxalic acid for a similar purpose while being many times more effective as oxalic acid in preserving workability.

In the drawing, the FIGURE is a curve showing workability characteristics of the preferred example of the present invention.

An alumina ramming mix is deemed herein to be one containing 60 to 95 percent by weight alumina, 2 to 8 percent plasticizing clay (e.g., Georgia kaolin or bentonite) and 3 to 5 percent phosphoric acid. Water, optionally up to 3 percent, may be added to reduce cost for less severe applications, may be present such as kyanite, mullite, calcined fire clay and comminuted fire brick or alumino-silicate brick. The alumina may be calcined alumina or tabular alumina −6 to −325 mesh size

EXAMPLE 1 (PREFERRED)

| Component | Percent by Weight |
| --- | --- |
| Calcined alumina<br>(70% −6 mesh; 30% −325 mesh) | 86 |
| Phosphoric acid | 4 |
| Aluminum phosphate<br>(Alkophos brand for "seeding") | 1 |
| Bentonite clay | 3.5 |
| Fire clay | 4.5 |
| Nitrilotriacetic acid | 1.0 |

These dry ingredients are first mixed to a homogeneous state. The nitrilotriacetic acid in water was then thoroughly dispersed therethrough, coating the solids. The phosphoric acid (85 percent strength, aqueous solution) was then added, along with any additional water solely for the purpose of producing a tempered mixture of the desired plasticity. The resultant ramming mix in terms of alumina and phosphoric acid content is standard, and scientifically based for comparison with the oxalic acid inhibited ramming mix of the above-entitled paper of Lyon et al. under the workability test standard of ASTM Test No. C–181–47, the results of which (example 1 above) are presented in the drawing.

Under the ASTM test, a cylindrical shape as a sample of the ramming mix is deformed in a compaction mold. Workability is computed after three impacts of a standard weight on the unrestricted sample. The result is a measurement of height change as a percentage of the original height, which is to say that compressibility (workability) can be expected to decline as the mix stiffens on aging.

The drawing is a curve showing workability of the mixture of example 1 under the above-identified ASTM test over a period of 60 days. The curve is justifiably extended to 84 days. For comparison to the work of Lyon et al. they specified preference for a 1:1 ratio of phosphoric acid and oxalic acid and reported the following results of workability under the ASTM test:

| Aging Time | Workability (%) |
| --- | --- |
| 0 | 32 |
| 22 | 37 |
| 42 | 23 |
| 84 | 20 |

It will be seen that we attain, by far, 5/46×workability in all respects, whether measured in terms of lapsed time or percent decline between measurements. Note that while the present mix declines from 76 percent workability to about 46 percent after the first 22 days, workability is nonetheless at a superior level to that attained by way of oxalic acid after the same time lapse while using a far less amount of nitrilotriacetic acid; and during the time period from 22 days to 84 days the decline in workability of the present mix was only 11 percent (5/46 100) compared to 46 percent (17/37×100) for the prior art. Our cost factor is always less, and performance is superior compared to the prior art, noting that the above data of Lyon et al. pertaining to workability are based on 3 percent phosphoric: 3 percent oxalic acid.

We obtain a substantially equal improvement when sutstituting ethylenediaminetetraacetic acid for nitrilotriacetic acid. Depending upon industrial requirements, we may, however, use as little as 0.5 percent or as much as 2 percent of an inhibitor selected from the group consisting of nitrilotriacetic acid and ethylenediaminetetraacetic acid in prolonging the life of a ramming mix in which the essentiaL refractory is alumina bondable by and containing phosphoric acid.

The lesser amount of the present inhibitor compared to oxalic acid, is significant from a standpoint other than cost, which is that less porosity is ultimately obtained. Thus, when the applied ramming mix is subjected to thermal hardening, the organic constituent (the inhibitor) burns off, so to speak, at about 400° F. leaving holes in the baked lining which can be penetrated by foreign materials, causing the rammed lining to deteriorate at a greater rate. In fact, it is this phenomenon which we have found presents the greater objection to oxalic acid because its combustible carbon content produces porosity to an objectionable degree when used in an amount capable of significantly retarding the aging of alumina-phosphoric acid ramming mix.

There is nothing critical about proportions. A ramming mix of particulate alumina bondable by phosphoric acid has long been known, plasticized as by a suitable clay in particulate form and only enough water to produce a mix which can be easily applied without slumping; and under the present invention aging can be retarded, to produce prolonged shelf life, by an amount of the inhibitor which will produce the asserted shelf life.

We claim:

1. A ramming mix consisting essentially of particulated alumina and phosphoric acid, plasticized by water and a clay, and in which the particles of alumina are precoated with an inhibitor selected from the group consisting of nitrilotriacetic acid and ethylenediaminetetraacetic acid in an effective amount for retarding aging.

2. A method of preparing a ramming mix from ingredients consisting essentially of alumina bondable by phosphoric acid, and a plasticizer, and comprising: mixing the alumina and plasticizer in particulate form, thereafter coating the mixed particles with an aqueous solution of an inhibitor selected from the group consisting of nitrilotriacetic acid and ethylenediaminetetraacetic acid in an effective amount for retarding aging, and then blending phosphoric acid therewith.

3. A ramming mix according to claim 1 in the following approximate proportions by weight:

| | |
|---|---|
| alumina | 60 to 95% |
| clay | 2 to 8% |
| phosphoric acid | 3 to 5% |
| inhibitor | 0.5 to 2% |
| water | up to 3% |

4. A method of preparation according to claim 2 in which the plasticizer is a clay and in which the components are used in the following approximate proportions by weight:

| | |
|---|---|
| alumina | 60 to 95% |
| clay | 2 to 8% |
| phosphoric acid | 3 to 5% |
| inhibitor | 0.5 to 2% |
| water | up to 3% |

* * * * *

CERTIFICATE OF CORRECTION

Patent No. 3,622,360                                    Dated November 23, 1971

Andrew B. Swanson and Rudolph T. Loher

It is certified that errors appear in the above identified patent and that said Letters Patent are hereby corrected as shown below:

> In the Specification, Column 1, line 7, change "or" to --of--; line 32, after "other" (and before "citric acid") insert --inhibitors which were studied, namely tartaric acid,--; line 61, after "added" insert --to impart additional plasticity. Diluent refractories,--;
> Column 2, line 39, cross out "5/46" and insert --greater--.

Signed and sealed this 16th day of May 1972.

(SEAL)
Attest:

EDWARD M. FLETCHER, JR.                      ROBERT GOTTSCHALK
Attesting Officer                                 Commissioner of Patents